United States Patent
Chou et al.

[19]

[11] Patent Number: 6,136,208
[45] Date of Patent: Oct. 24, 2000

[54] MANUFACTURING METHOD FOR PLANAR MICROPROBE INCLUDING ELECTROSTATIC ACTUATOR USING SACRIFICIAL LAYER TECHNOLOGY

[75] Inventors: Rou-Fu Chou, Hualien; Wen-Syang Hsu, Hsinchu; Shih-Che Lo, Ilan; Hsi-Fu Lin, Taipei, all of Taiwan

[73] Assignee: Industrial Technology Research Institute, Hsinchu, Taiwan

[21] Appl. No.: 09/374,829

[22] Filed: Aug. 13, 1999

[30] Foreign Application Priority Data

May 3, 1999 [TW] Taiwan ................................. 88107101

[51] Int. Cl.⁷ .................................................. H01L 21/302
[52] U.S. Cl. .................................. 216/2; 216/11; 438/52; 205/122; 205/223
[58] Field of Search ........................... 216/2, 11; 438/52; 205/122, 223

[56] References Cited

U.S. PATENT DOCUMENTS

| | | | |
|---|---|---|---|
| 5,066,358 | 11/1991 | Quate et al. | 216/11 |
| 5,258,107 | 11/1993 | Yoshida et al. | 216/11 |
| 5,354,985 | 10/1994 | Quate | 250/234 |
| 5,454,906 | 10/1995 | Baker et al. | 216/2 |
| 5,595,942 | 1/1997 | Albrecht et al. | 437/228 |
| 5,666,190 | 9/1997 | Quate et al. | 355/71 |
| 5,886,261 | 3/1999 | Mueller et al. | 73/514.36 |
| 5,994,750 | 11/1999 | Yagi | 257/415 |
| 6,020,215 | 2/2000 | Yagi et al. | 216/11 |
| 6,027,630 | 2/2000 | Cohen | 205/135 |

FOREIGN PATENT DOCUMENTS

766089 A2   4/1997   European Pat. Off. .

OTHER PUBLICATIONS

J. Brugger, et al., "Microlever with combined integrated sensor/actuator functions for scanning force microscopy", Sensors and Actuators A, 43 (1994) pp. 339–345.

*Primary Examiner*—Randy Gulakowski
*Assistant Examiner*—Anita Alanko
*Attorney, Agent, or Firm*—Kenyon & Kenyon

[57] ABSTRACT

The present invention discloses a planar microprobe and method of manufacturing the same. The present invention utilizes semiconductor process technologies that includes electroplating technology and sacrificial layer technology to integrate constituent elements on a silicon wafer having an insulator layer. The planar microprobe comprises: an upper cantilever beam including a first electrode; a supporting pad coupled to the upper cantilever beam; and a lower cantilever beam coupled to the supporting pad, situated below the upper cantilever beam and spaced by a distance from the upper cantilever beam. Besides, the lower cantilever beam comprises: a second electrode in cooperation with the first electrode to control a vertical displacement of the lower cantilever beam by applying an external voltage thereto. A tip is coupled to the second electrode. The microprobe is manufactured by depositing a photoresist sacrificial layer on a lower cantilever beam. Metal is electroplated to form an upper cantilever beam. Then, residual silicon, silicon oxide and photoresist are etched to release the microprobe.

2 Claims, 3 Drawing Sheets

MANUFACTURING METHOD FOR PLANAR MICROPROBE INCLUDING ELECTROSTATIC ACTUATOR USING SACRIFICIAL LAYER TECHNOLOGY

BACKGROUND OF THIS INVENTION

1. Field of the Invention

The present invention relates to a planar microprobe, more particularly to a planar microprobe integrated with an electrostatic actuator and is realized by sacrificial layer technology and microelectroforming technology.

2. Description of the Related Art

The appearance of microprobes mainly has two kinds. One is the so-called "cubic probe", whose tip is protruded from the plane of the cantilever beam. Another is the so-called "planar probe", whose tip is coplanar with the cantilever beam. The probe of this invention is the type of the planar probe. The cubic probe including an electrostatic actuator was previously used to drive the probe to move in the direction perpendicular to the surface of the cantilever beam. The electrostatic actuator of the cubic probe is made by bonding two silicon wafers which are used as an upper cantilever beam and a lower cantilever beam. The above-mentioned cubic probe is disclosed in "Microlever with Combined Integrated Sensor/Actuator Functions for Scanning Force Microscopy," Sensors and Actuators, A, 43 (1994) pp. 339–345, by J. Brugger, N. Blanc, Ph. Renaud and N. F. de Rooij. The prior art cubic probe has several drawbacks as follows:

(1) The diameter of the tip of the cubic probe is more than 10 nm, but the diameter of the tip of the planar microprobe can reach 1 nm.

(2) Because of the uneasy alignment between the upper cantilever beam and lower cantilever beam, external voltage control will lose its accuracy if a misalignment occurs.

(3) Because the thicknesses of the two silicon wafers are not easy to control, the thicknesses and rigidities of the products produced in batches are not fixed, and thus the operating characteristic will fluctuate.

(4) The electrode plate is made of a heavily doped silicon wafer. The wafer has larger resistance. Accordingly, the problems of power-consumption and difficult heat-dissipation occur.

SUMMARY OF THIS INVENTION

The object of the present invention is to eliminate the drawbacks of the large diameter of the tip, the misalignment between the upper cantilever beam and lower cantilever beam, the uneasy controlling of the thickness of the cantilever beams and the large resistance. To this end, the present invention integrates an electrostatic actuator in a planar microprobe. The method of the present invention utilizes sacrificial layer technology and microelectroforming technology to integrate a cantilever beam made of a metal whose conductivity is better than silicon, and which is used as an upper electrode above the planar microprobe. Besides, because of the implementation of electroplating, the manufacturing process does not need any alignment equipment. Because the material of the sacrificial layer is a photoresist instead of a silicon oxide, the thickness of the sacrificial layer is flexible. The present invention uses semiconductor process technologies that include electroplating technology and sacrificial layer technology to integrate main constituent elements on a SOI wafer including an insulator layer. The planar microprobe comprises: an upper cantilever beam including a first electrode; a supporting pad coupled to said upper cantilever beam; and a lower cantilever beam coupled to said supporting pad, situated below said upper cantilever beam and spaced by a distance from said upper cantilever beam. The lower cantilever beam comprising: a second electrode, in cooperation with said first electrode to control a vertical displacement of said lower cantilever beam by applying an external voltage thereto; and a tip coupled to said second electrode.

The method of manufacturing said planar microprobe mainly comprises the following steps: patterning the lower cantilever beam and supporting pad on a SOI substrate; patterning the tip on the lower cantilever beam; depositing a layer of metal as a second electrode on the lower cantilever beam; forming a thick layer of photoresist as a sacrificial layer and sputtering a layer of metal as an electrode for electroplating at the location of the lower cantilever beam; patterning an upper cantilever beam; electroplating a layer of metal on the lower cantilever beam; etching out residual silicon materials and a silicon oxide under said lower cantilever beam; removing residual photoresist and the sacrificial layer by a developer solution; and dipping the probe into acidic liquid to remove the metallic film of the electroplated layer.

BRIEF DESCRIPTION OF THE DRAWINGS

This invention will be described according to the accompanying drawings in which.

PREFERRED EMBODIMENT OF THIS INVENTION

Figure 1:
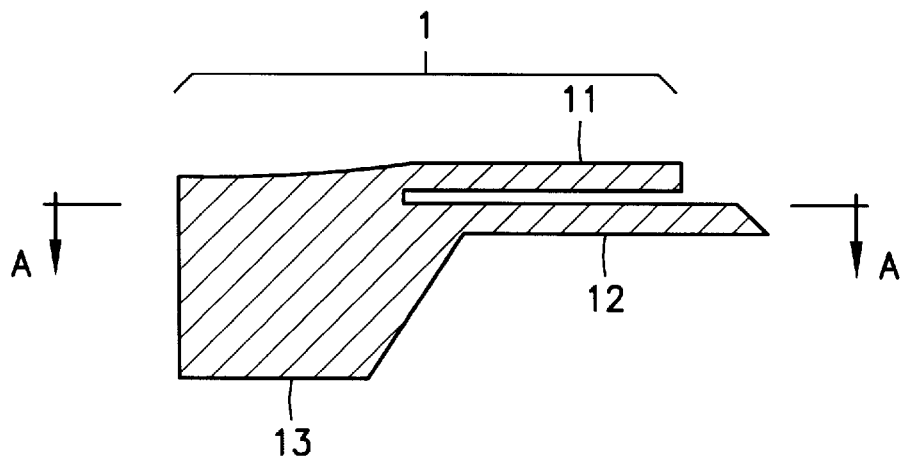
FIG. 1 is a cross-sectional view of a planar microprobe according to the present invention.

FIG. 1 shows a planar microprobe 1 having an electrostatic actuator according to an embodiment of the present invention. The probe mainly comprises an upper cantilever beam 11 and a lower cantilever beam 12. The upper cantilever beam 11 is made of a layer of electroplated metal such as nickel and used as an electrode. A supporting pad 13 connected to the upper cantilever beam 11, whose substrate is made of a silicon wafer or SOI (Silicon On Insulator) wafer. Hereinafter the SOI wafer will be used as an example. The a lower cantilever beam 12 is connected to the supporting pad 13, situated below the upper cantilever beam 11, and spaced from the upper cantilever beam 11. An electrostatic actuator is formed by the upper cantilever beam 11 and the lower cantilever beam 12. The actuator applies voltage on electrodes respectively disposed on the upper cantilever beam 11 and the lower cantilever beam 12 to produce an vertical displacement of the lower cantilever beam 12.

Figure 2:
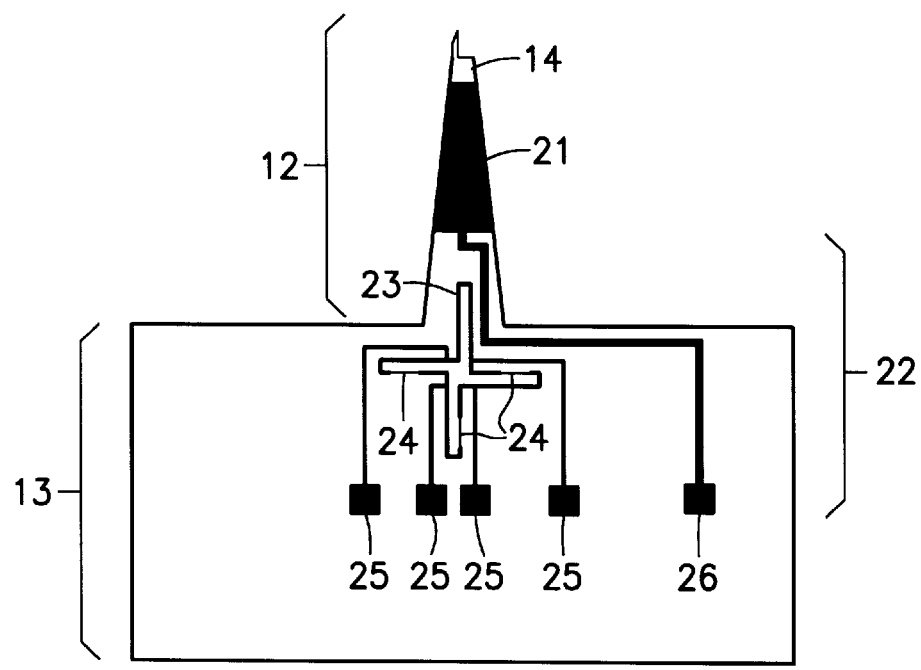
FIG. 2 is a cross-sectional view taken along line A—A of the planar microprobe in FIG. 1.

FIG. 2 is a cross-sectional view taken from line A—A of FIG. 1. The lower cantilever beam comprises a tip 14. The tip 14 is used for touching an object (not shown)to be measured. A counter-electrode 21 is connected to the tip 14. The electrode can be optionally connected to a contact pad 26 and cooperates with an electrode (not shown) disposed or, the upper cantilever beam 11 to control the contact intensity between the tip 14 and the object to be measured by a voltage source (not shown) external to the probe. A Wheatstone bridge circuit 22 is situated at the intersection of the supporting pad 13 and the lower cantilever beam 12. The Wheatstone bridge circuit 22 includes four piezoresistors (23, 24, 24, 24) connected each other by an aluminum line; wherein the first piezoresistor 23 is situated on the root part of the lower cantilever beam 12 to detect a stress change of the lower cantilever beam 12 caused by the contact between the tip 14 and the object to be measured. The stress change causes the resistance of the first piezoresistor 23 to change. Four contact pads 25 are connected to the four piezoresistors (23, 24, 24, 24), wherein two contact pads connected to the voltage source external to the planar microprobe. The voltage source provides the operating voltage of the Wheatstone bridge circuit 22. The other contact pads convert the resistance change of the Wheatstone bridge circuit 22 into a voltage difference. The voltage difference is output to a control mechanism (not shown) outside the planar microprobe. The control mechanism changes the voltage source (not shown) connected to the electrode of the planar microprobe by using a feedback method. The flatness of the surface of the object to be detected is obtained from a fluctuation curve of the voltage source. Alternatively, a laser apparatus (not shown) can be used to emit a laser light to the lower cantilever beam 12. A laser light receiving means (not shown) is used to receive the reflected laser light. A vertical displacement of the tip 14 can be measured from the angle of the reflected laser light.

FIGS. 3(a)~(h) shows cross-sectional views taken during the manufacturing procedure of the planar microprobe according to the present invention. A SOI wafer includes a silicon substrate 31, an oxide layer 33, and a silicon layer 34. The bottom of the SOI wafer has a layer of oxide 32 of about 1 um thickness. The oxide layer 32 can be used as a mask in the backside etching process, and therefore the oxide layer 32 will be protected by a photoresist in the following process steps.

Figure 3A:
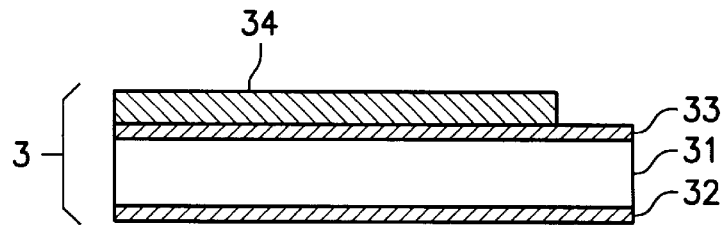
FIGS. 3(a)~(h) are cross-sectional views taken during the manufacturing procedures of the planar microprobe according to the present invention.

FIG. 3(a) is a cross-sectional view of the probe at the first step of the process. At the beginning of the process, an oxide layer (not shown) will be formed by a wet oxidizing process as a mask for etching a silicon layer 34. The first mask and a BOE (buffer oxide enchant) etching liquid are used to pattern a lower cantilever beam and a plane including a supporting pad and the lower cantilever beam. A KOH etching liquid and silicon anisotropy etching process are used to remove residual silicon on the silicon layer.

Figure 3B:
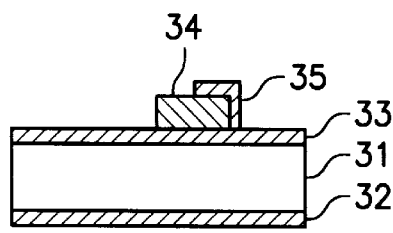

FIG. 3(b) is another cross-sectional view of the probe in the process. A layer of oxide 35 is formed. The region above the tip is patterned by a second mask. Finally, the residual silicon will be removed by a KOH etching liquid.

Figure 3C:
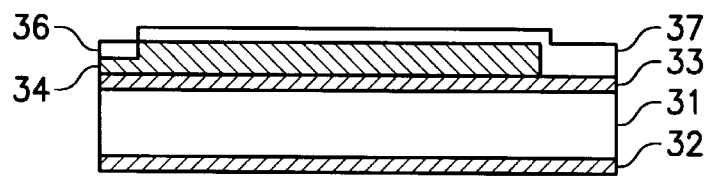

FIG. 3(c) is a cross-sectional view of the probe in the process. A layer of photoresist 37 is coated as a doping mask, and then the third mask is used to define a region for piezoresistors. A shallow boron implantation 36 is performed to achieve the function of the piezoresistors.

Figure 3D:
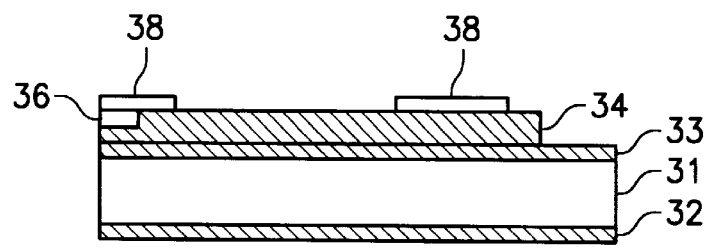

FIG. 3(d) is a cross-sectional view of the probe in the process. A fourth mask is used to pattern metal lines, a second counter-electrode and contact pads on the photoresist. A layer of aluminum 38 is deposited on the photoresist and a silicon layer 34 by using thermal coating. Lift-off technique is used to remove the photoresist and the aluminum 38 adhered on the photoresist.

Figure 3E:
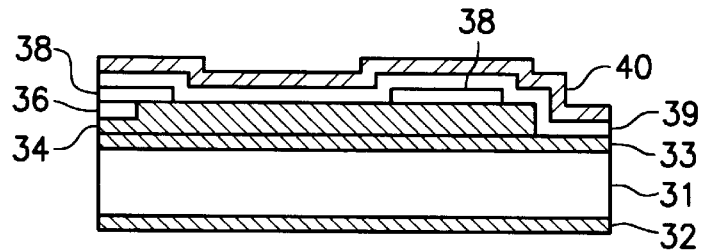

FIG. 3(e) is a cross-sectional view of the probe in the process. A layer of thick photoresist (not shown) is coated as a sacrificial layer. A fifth mask is used to pattern the sacrificial layer 39. A UV light is used to flood expose the sacrificial layer 39. Finally, a film of copper 40 is deposited by sputtering to form an electrode for electroplating.

Figure 3F:
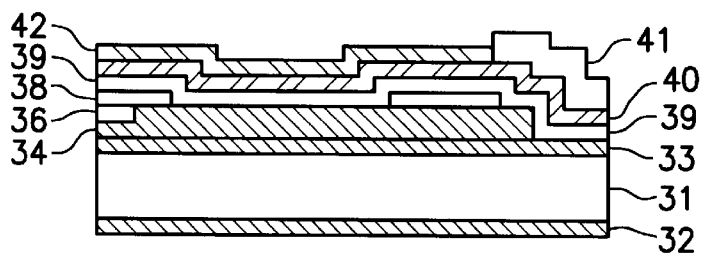

FIG. 3(f) is a cross-sectional view of the probe in the process. A second thick photoresist 41 is coated. A sixth mask is used to pattern an upper cantilever beam shape in the thick layer photoresist. After development is performed, a layer of nickel 42 is electroplated as an upper cantilever beam and a first electrode.

Figure 3G:
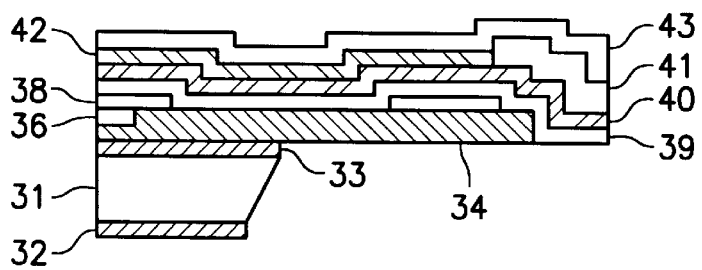

FIG. 3(g) is a cross-sectional view of the probe in the process. A thick layer of photoresist 43 is coated to protect the metallic material from being etched by the BOE etching liquid. A seventh mask is used to pattern the backside of the SOI substrate. An etching liquid is used to remove the residual silicon material below the lower cantilever beam.

Figure 3H:
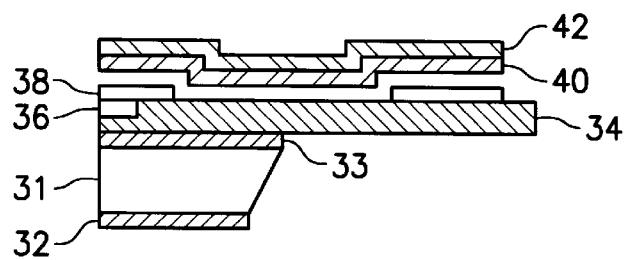

FIG. 3(h) is a cross-sectional view of the probe in the process. A developer solution is used to remove all the photoresists and the sacrificial layer 39, to release the upper cantilever beam of the probe. Then the probe is dipped into an acidic liquid for several seconds to remove the copper film 40 that served as an electrode for electroplating process.

The above-described embodiments of the invention are intended to be illustrated only. Numerous alternative embodiments may be devised by those skilled in the art without departing from the scope of the following claims.

What is claimed is:

1. A method of manufacturing a planar microprobe including an electrostatic actuator, said planar microprobe comprising: an upper cantilever beam including a first electrode, a supporting pad coupled to said upper cantilever beam, and a lower cantilever beam coupled to said supporting pad: said lower cantilever beam situated below said upper cantilever beam and spaced by a distance from said upper cantilever beam, said lower cantilever beam comprising a second electrode and a tip coupled to said second electrode; said method comprising the following steps of:

(a) patterning the lower cantilever beam and supporting pad on a SOI substrate;
    (b) patterning the tip on the lower cantilever beam;
    (c) depositing a layer of metal as the second electrode on the lower cantilever beam;
    (d) on the lower cantilever beam, forming a layer of photoresist as a sacrificial layer and sputtering a layer of metal as an electrode for an electroplating process;
    (e) forming the upper cantilever beam by electroplating a layer of metal over the lower cantilever beam;
    (f) etching residual silicon materials and a silicon oxide beneath said lower cantilever beam;
    (g) removing residual photoresist and sacrificial layer by a developer solution to release the upper cantilever beam and dipping the microprobe into an acidic liquid to remove the layer of metal that served as an electrode for the electroplating process.

2. The method of claim 1, after step (b) further comprising the step of generating several piezoresistors by way of shallow boron implantation at the junction of said lower cantilever beam and said supporting pad.

* * * * *

UNITED STATES PATENT AND TRADEMARK OFFICE
CERTIFICATE OF CORRECTION

PATENT No. : 6,136,208

DATED : October 24, 2000

INVENTOR(S): CHOU et al.

It is certified that error appears in the above-identified patent and that said Letters Patent is hereby corrected as shown below:

Column 2, line 63, after "disposed" delete "or," and insert -- on -- .

Signed and Sealed this

Eighth Day of May, 2001

Attest:

NICHOLAS P. GODICI

*Attesting Officer*    Acting Director of the United States Patent and Trademark Office